United States Patent [19]
Karl

[11] Patent Number: 5,383,636
[45] Date of Patent: Jan. 24, 1995

[54] BRACKET SYSTEM FOR MOUNTING A CABLE SPLICING TOOL TO A PEDESTAL

[76] Inventor: Darwin M. Karl, 7887 Highland Dr., Minocqua, Wis. 54548

[21] Appl. No.: 992,151

[22] Filed: Dec. 17, 1992

[51] Int. Cl.⁶ ............................................. F16M 13/02
[52] U.S. Cl. ................... 248/278; 248/229; 248/231.7; 248/289.1
[58] Field of Search ............... 248/229, 183, 278, 282, 248/284, 285, 286, 287, 231.7, 535, 541, 558, 911, 912, 289.1

[56] References Cited

U.S. PATENT DOCUMENTS

| | | |
|---|---|---|
| 263,829 | 9/1882 | Weston ................................ 248/282 |
| 1,905,623 | 4/1933 | Deitz . |
| 2,431,400 | 11/1947 | Iverson . |
| 3,330,045 | 7/1967 | Selleck . |
| 3,485,471 | 12/1969 | McCurdy ........................ 248/284 X |
| 3,904,161 | 9/1975 | Scott .................................... 248/541 |
| 4,042,200 | 8/1977 | Overall . |
| 4,270,721 | 6/1981 | Mainor, Jr. . |
| 4,417,741 | 11/1983 | Ciocan . |
| 4,711,422 | 12/1987 | Ibanez .............................. 248/535 X |
| 4,717,103 | 1/1988 | Kester et al. ................... 248/229 X |
| 4,729,535 | 3/1988 | Frazier et al. . |
| 4,946,122 | 8/1990 | Ramsey et al. ..................... 248/229 |

Primary Examiner—Rinaldi I. Rada
Assistant Examiner—Clark F. Dexter
Attorney, Agent, or Firm—Andrus, Sceales, Starke & Sawall

[57] ABSTRACT

A bracket for mounting a cable splicing head or other splicing tool to an electrical pedestal includes a pair of clamp assemblies pivotably mounted at opposite ends of a body member. Set screws are provided for fixing the position of the body member relative to the clamp members. An arm is mounted to and extends outwardly from the body member. One of a series of mounting members is connected to the arm, and includes an arrangement for mounting the shaft of a cable splicing head to the arm.

11 Claims, 3 Drawing Sheets

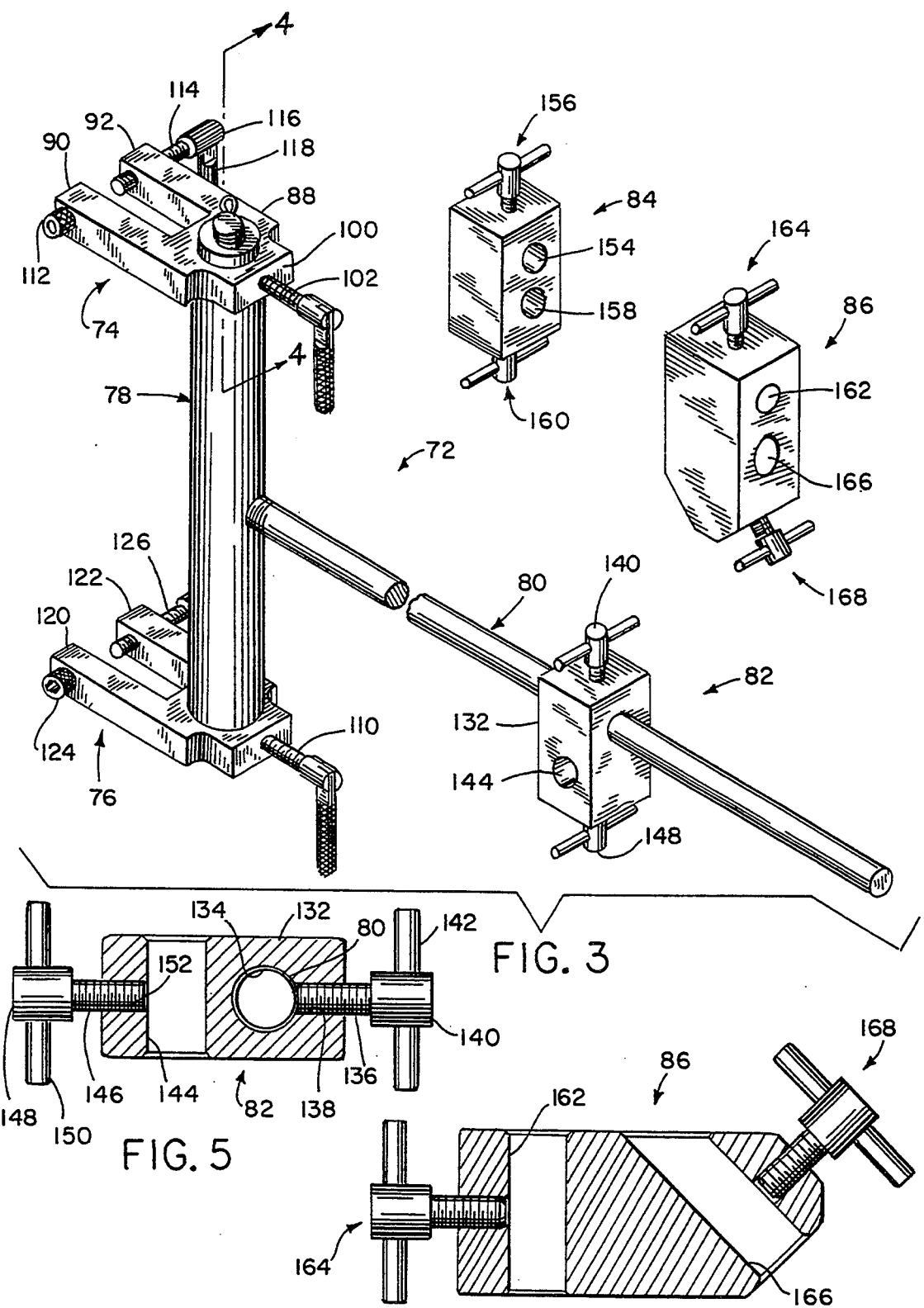

BRACKET SYSTEM FOR MOUNTING A CABLE SPLICING TOOL TO A PEDESTAL

BACKGROUND AND SUMMARY

This invention pertains to an arrangement for mounting a cable splicing head to an electrical pedestal.

In splicing a cable adjacent an electrical pedestal, it is known to provide a bracket assembly for mounting a conventional cable splicing head which includes a shaft. The bracket includes a slot for receiving the lower end of the shaft, and an arrangement for clamping the lower end of the shaft in a desired position to fix the cable splicing head to the pedestal. The bracket is a single-purpose tool, and generally provides positioning of the cable splicing head throughout a limited range of positions relative to the pedestal.

It is an object of the present invention to provide an improved bracket assembly for mounting a cable splicing head to an electrical pedestal, with the bracket assembly being relatively simple in its construction and operation and providing increased stability for the splicing head. It is a further object of the invention to provide a bracket assembly for mounting the cable splicing head throughout a range of positions. Yet another object of the invention is to provide a bracket assembly for mounting a cable splicing head, as well as for mounting other tools employed in cable work adjacent an electrical pedestal.

In accordance with the invention, a mounting bracket for mounting a cable splicing head to an electrical pedestal having one or more walls includes a body member defining first and second ends, and a pair of clamp members pivotably mounted one to each end of the body member. The clamp members function to mount the body member to one of the pedestal walls. A position fixing arrangement is interposed between each clamp member and each end of the body member for selectively fixing the rotational position of the body member relative to the clamp members. An arm is mounted to and extends outwardly from the body member, and a mounting member is engageable with the arm. The mounting member includes a mounting arrangement for mounting the splicing head to the arm. Each clamp member defines an opening for receiving one of the ends of the body member, with the body member end being pivotable within the opening. The position fixing arrangement includes a set screw mounted to each clamp member movable into and out of engagement with the end of the body member, to selectively fix the position of the body member relative to the clamp member. A removable mounting arrangement is interposed between the arm and the body member. The removable mounting arrangement is preferably in the form of a threaded opening formed in the body member, and a threaded end provided on the arm for removable engagement with the threaded opening. The mounting member includes a passage within which the mounting shaft of the cable splicing head is received. A set screw is located adjacent the passage for fixing the position of the cable splicing head mounting shaft relative to the mounting member. The mounting member further includes a second passage within which the arm is received, and a second set screw adjacent the second passage for fixing the position of the mounting member relative to the arm.

The invention further contemplates a kit for mounting a cable splicing head to an electrical pedestal. The kit includes a bracket assembly mountable to one of the pedestal walls, and including an arm extending outwardly from the pedestal when the bracket assembly is mounted thereto. The kit further includes a series of mounting members engageable with the arm, with each mounting member defining a passage for receiving the mounting shaft of the cable splicing head. The passage defined by each mounting member is oriented differently than the passage defined by the remainder of the mounting members, to provide mounting of the cable splicing head in different orientations relative to the arm. The bracket assembly is preferably constructed as summarized above. Each of the mounting members includes a second passage within which the arm is received, for providing engagement of the mounting member with the arm. Each mounting member further includes a first set screw adjacent the passage within which the arm is received for fixing the position of the arm relative to the mounting member, and a second set screw adjacent the passage in each mounting member within which the cable splicing head mounting shaft is received, for fixing the position of the mounting member relative to the cable splicing head mounting shaft.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 3 is an isometric view of the bracket assembly of FIG. 2 showing the various mounting members for mounting the cable splicing head to the arm of the bracket assembly;

FIGS. 5 and 6 are section views through the mounting members for mounting the shaft of the cable splicing head in varying positions.

DETAILED DESCRIPTION OF THE PRIOR ART

Figure 1:
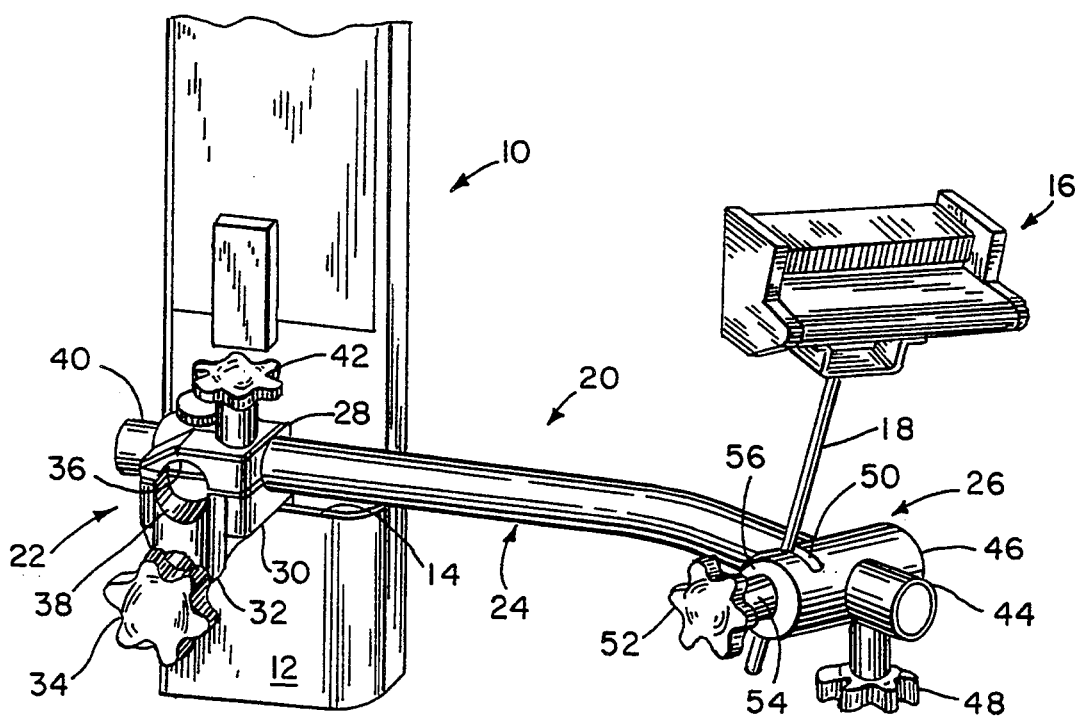
FIG. 1 is an isometric view of a prior art bracket assembly for mounting a cable splicing head to an electrical pedestal.

FIG. 1 illustrates an electrical pedestal 10 having a front wall 12 defining an upper edge 14. In a manner as is known, the interior of pedestal 10 contains the end of an underground electrical cable having multiple wires. A conventional cable splicing head 16 is employed to splice the various wires of the underground cable to those associated with another underground cable, through which electricity is supplied to a building.

Cable splicing head 16 includes a shaft 18. A bracket assembly 20 is mounted to pedestal 10 for fixing cable splicing head 16 in position relative to pedestal 10 during splicing of the cable wires. Bracket assembly 20 generally includes a clamp assembly 22, an arm 24, and a mounting assembly 26.

Clamp assembly 22 includes an upper block 28 and a lower block 30. Lower block 30 defines a pair of depending legs, one of which is shown at 32. A second leg is spaced from leg 32, and is disposed against the inside surface of pedestal wall 12. A knob 34 is mounted to the end of a threaded shank which extends through a threaded opening formed in leg 32. When knob 34 is turned, the outer end of the threaded shank engages the outer surface of pedestal wall 12, to clamp pedestal wall 12 against the inner leg of lower block 30. This functions to mount clamp assembly 22 to pedestal wall 12.

Upper block 28 and lower block 30 include recesses, such as shown at 36, 38, respectively, for receiving the inner end 40 of arm 24. Recesses similar to those shown at 36, 38 are formed in each side of blocks 28, 30, to define a pair of right-angle passages within which inner end 40 of arm 24 can be positioned, in a manner as is shown in FIG. 1.

A knob 42 is mounted to the end of a threaded shank, which is engaged with internally threaded passages formed in blocks 28, 30. Turning of knob 42 moves upper block 28 toward lower block 30, to clamp inner end 40 of arm 24 therebetween when arm 24 is positioned as desired relative to blocks 28, 30.

Mounting assembly 26 is engageable with the outer end 44 of arm 24. A bend is provided between inner end 40 and outer end 44 of arm 24. Mounting assembly 26 includes a block 46 having a passage therethrough within which outer end 44 of arm 24 is received. A knob 48 is mounted to the outer end of a threaded shank, the inner end of which functions to clamp block 46 in position on arm outer end 44 upon turning of knob 48 when block 46 is positioned as desired.

A slot 50 is formed in block 46, and is adapted to receive shaft 18 of cable splicing head 16. A knob 52 is mounted to the outer end of a threaded shank which extends through a collar 54 and into an internally threaded passage extending inwardly from the face of block 46, which is shown at 56. The internally threaded passage and the shank to which knob 52 is mounted extend past slot 50, and function to clamp shaft 18 relative to block 46 when cable splicing head 16 is moved to a desired position.

DETAILED DESCRIPTION OF THE INVENTION

Figure 2:
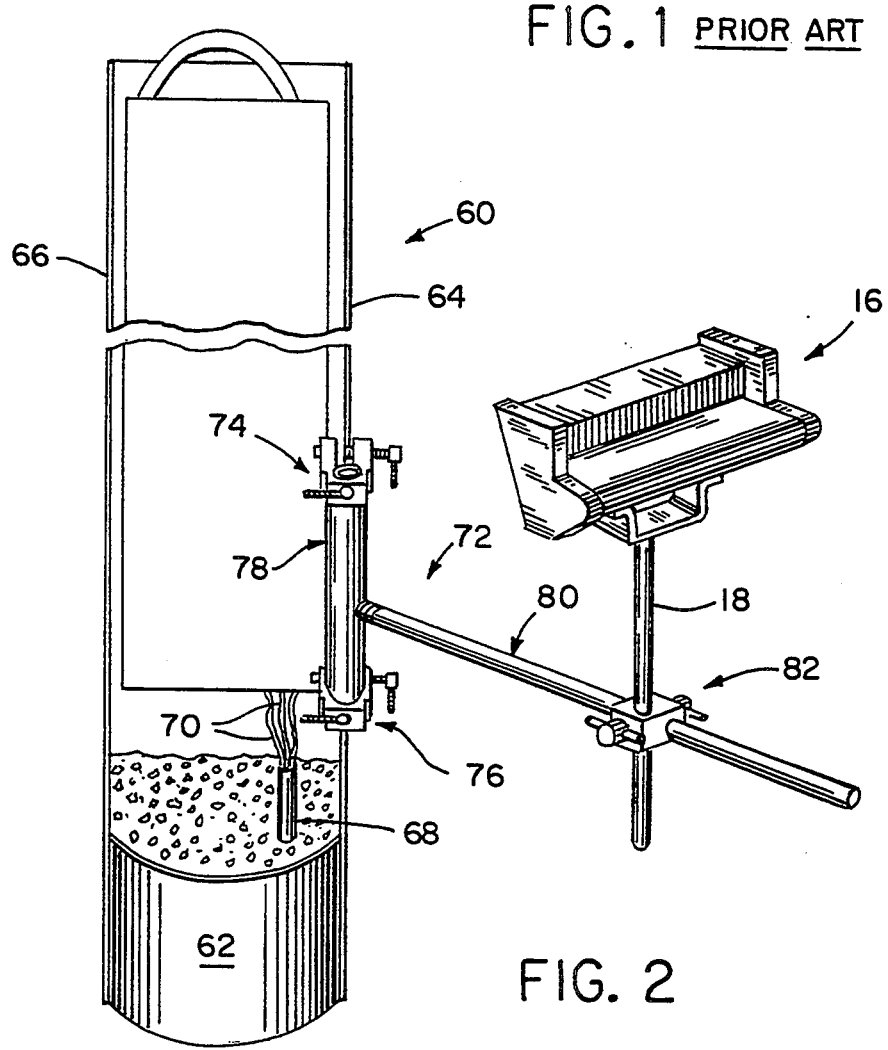
FIG. 2 is an isometric view of the bracket assembly of the invention for mounting a cable splicing head to an electrical pedestal.

FIG. 2 illustrates an electrical pedestal 60 having a shape somewhat different than that of pedestal 10 (FIG. 1). Pedestal 60 defines an arcuate front wall 62 extending between a pair of side walls 64, 66. Side walls 64, 66 each define a forwardly facing edge. Side walls 64, 66 and front wall 62 define an opening providing access to the interior of pedestal 60, and a cover is adapted to be secured to side walls 64, 66 to close the opening and to seal the interior of pedestal 60.

An electrical cable 68 having a series of wires 70 extends from underground into the interior of pedestal 60.

A bracket assembly 72, constructed according to the invention, is provided for mounting cable splicing head 16 to one of the walls, in this case side wall 64, of pedestal 60. Generally, bracket assembly 72 includes an upper clamp assembly 74 and a lower clamp assembly 76 mounted to the upper and lower ends, respectively, of a body 78; an arm 80 extending outwardly from body 78; and a mounting assembly 82 for receiving shaft 18 of cable splicing head 16 and for mounting cable splicing head 16 to arm 80.

FIG. 3 illustrates bracket assembly 72 in detail, showing mounting assembly 82 connected to arm 80. Alternatively, one of mounting assemblies 84, 86 can be connected to arm 80 for mounting cable splicing head shaft 18 thereto. Bracket assembly 72 is supplied with mounting assemblies 82-86, and a selected one is employed to orient cable splicing head 16 in a desired position, in a manner to be explained.

Figure 4:
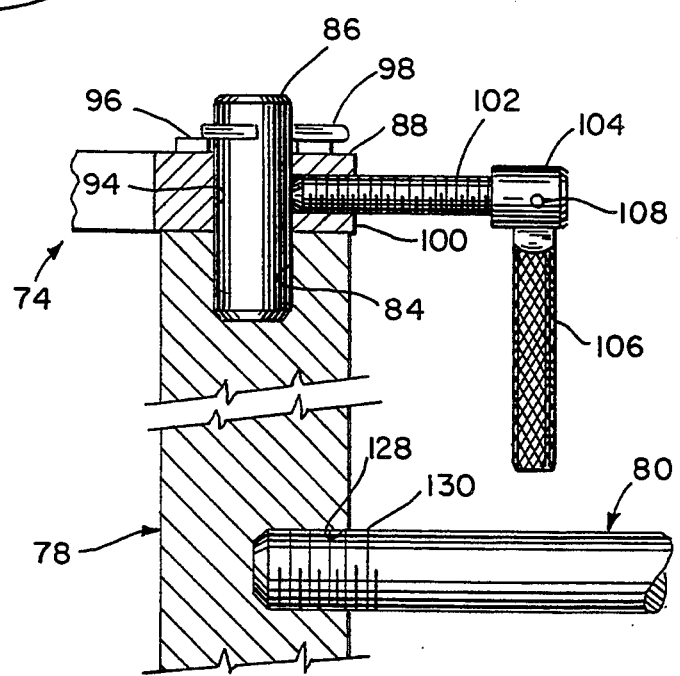
FIG. 4 is a partial section view taken along line 4—4 of FIG. 3.

Referring to FIGS. 3 and 4, body 78 is a cylindrical member defining a pair of spaced ends. Clamp assemblies 74, 76 are pivotably mounted to the ends of body member 78, and are identical in construction and in the manner in which each is mounted to body member 78. As shown in FIG. 4, the upper end of cylindrical body 78 is provided with a bore 84 within which a pin 86 is received. Pin 86 is non-rotatably mounted to body 78 within bore 84, extending upwardly from the upper end of body 78. Clamp assembly 74 includes a U-shaped clamp member defining a base 88 and a pair of legs 90, 92 (FIG. 3). A passage 94 (FIG. 4) extends through base 88, and pin 86 is received within passage 94, such that the upper end of body 78 abuts the lower surface of base 88. Pin 86 extends above the upper surface of base 88. A washer 96 is placed against the upper surface of base 88, and a retainer 98 is fixed to pin 86 adjacent washer 96 to securely mount upper clamp assembly 74 to the upper end of body 78. With this arrangement, upper clamp assembly 74 is rotatable relative to body 78 about an axis coincident with the longitudinal axis of body 78.

A threaded passage extends between passage 94 and the outer end of base 88, shown at 100. A threaded screw 102 is threadedly engaged with the threaded passage, and a head 104 is mounted to the end of screw 102. A screw handle 106 is pivotably mounted to head 104 via a pin 108.

Turning of screw 102 via handle 106 functions to clamp pin 86 in a desired position relative to base 88 when the end of screw 102 is engaged with pin 86. Turning screw 102 out of engagement with pin 86 allows pivoting movement of clamp assembly 74 relative to body 78. Thus, the position of clamp assembly 74 relative to body 78 can selectively be fixed by operation of screw 102.

An identical mounting arrangement is provided at the lower end of cylindrical body 78, for mounting lower clamp assembly 76 thereto. A screw 110 functions to selectively fix the rotational position of lower clamp assembly 76 relative to body 78, in the same manner as explained above with respect to screw 102.

Referring still to FIG. 3, the outer end of each of legs 90, 92 of upper clamp assembly 74 is provided with a transverse internally-threaded passage. A screw having a head 112 extends through the passage in leg 90, terminating in an inner end disposed within the space between legs 90, 92. An adjustable screw 114 extends through the threaded passage in leg 92, terminating in an inner end disposed within the space between legs 90, 92. Screw 114 includes a head 116, to which a handle 118 is pivotably mounted. Screw 114 is selectively turned by operation of handle 118 toward and away from the inner end of the screw extending through the threaded passage in leg 90, for selectively clamping or releasing one of the walls of pedestal 60, such as wall 64, therebetween. Similarly, the legs of lower clamping assembly 76, shown at 120, 122, are provided with transverse threaded passages. A screw having a head 124 extends through the threaded passage in leg 120, and includes an inner end disposed in the space between legs 120, 122. An adjustable screw 126 extends through the threaded passage formed in leg 122, and includes a head and handle similar to 116, 118. As described above with respect to upper clamp assembly 74, this arrangement provides clamping of lower clamp assembly 76 to one of the walls of pedestal 60, such as side wall 64.

Referring to FIG. 4, an internally threaded passage 128 extends inwardly into body 78 at approximately its midpoint between upper and lower clamp assemblies 74, 76. The longitudinal axis of passage 128 is substantially perpendicular to that of body 78. The inner end of arm 80 is provided with external threads 130 adapted for threaded engagement with internally threaded passage 128. With this arrangement, arm 80 is removably mounted to body 78.

As shown in FIGS. 3 and 5, mounting assembly 82 consists of a block 132 having a passage 134 extending therethrough, through which arm 80 extends. A set screw 136 is engaged within an internally threaded passage 138 formed in block 132. Set screw 136 includes a head 140 and a handle 142, by which set screw 136 is turned within passage 138 to clamp mounting assembly 82 in a selected position on arm 80.

A shaft-mounting passage 144 extends through block 132, extending along an axis substantially perpendicular to that of passage 134. A set screw 146 having a head 148 and a handle 150 is mounted within an internally threaded passage 152 formed in block 132. Passage 144 is adapted to receive shaft 18 of cable splicing head 16, and set screw 146 is operable to clamp shaft 18 in a desired position within passage 144 relative to block 132, in a manner as is shown in FIG. 2.

Alternatively, one of blocks 84, 86 can be mounted to arm 80 for receiving shaft 18 of cable splicing head 16. Mounting assembly 84 includes a passage 154 within which arm 80 is received, and a set screw assembly 156 for fixing mounting assembly 84 in position on arm 80. A passage 158 extends parallel to passage 154, and is adapted to receive cable splicing head shaft 18. A set screw assembly 160 is provided for fixing the position of shaft 18 relative to mounting assembly 84.

Mounting assembly 86 similarly includes a passage 162 within which arm 80 is received, and a set screw assembly 164 for fixing the position of mounting assembly 86 relative to arm 80. Referring to FIGS. 3 and 6, mounting assembly 86 further includes a passage 166 oriented at an angle of approximately 45° relative to passage 162 for receiving cable splicing head shaft 18. A set screw assembly 168 is provided for fixing the position of shaft 18 within passage 166.

Preferably, mounting assemblies 82, 84 and 86 are all provided in kit form along with bracket assembly 72 and rod 80, and a selected one of mounting assemblies 82, 84 and 86 is employed as desired for allowing an operator to position cable splicing head 16 in a desired orientation relative to pedestal 60.

In operation, clamp assemblies 74, 76 are first secured to one of the walls of pedestal 60, such as side wall 64, in a manner as described above by operation of set screws 114, 126. Arm 80 is then threadedly engaged with internally threaded passage 128 in body 78, so as to extend outwardly therefrom as illustrated in FIGS. 2 and 3. The operator then selects one of mounting assemblies 82, 84 and 86, and mounts the selected mounting assembly to arm 80 by means of the set screw assembly associated with the selected mounting assembly. Cable splicing head 16 is then mounted to the selected mounting assembly via its shaft 18 being received within the shaft-receiving passage formed in the mounting assembly block, and the set screw assembly associated with the mounting assembly is employed to fix the position of cable splicing head shaft 18 relative to the mounting assembly.

After cable splicing head 16 is mounted to arm 80 by the selected one of mounting assemblies 82, 84 and 86, arm 80 is moved to its desired position by pivoting body 78 relative to clamp assemblies 74, 76. Once the desired rotational position of arm 80 is attained, set screws 102, 110 are employed to fix body 78 in its desired position.

It can thus be appreciated that cable splicing head 16 can be moved throughout a wide range of positions relative to pedestal 60. For example, the vertical position of cable splicing head 16 can be adjusted by adjusting the position of cable splicing head shaft 18 relative to the mounting assembly by which it is secured to arm 80. Similarly, the distance between cable splicing head 16 and pedestal 60 can be adjusted by adjusting the position of the mounting assembly on arm 80. The rotational position of cable splicing head 16 can be adjusted by pivoting body 78 relative to clamp assemblies 74, 76.

The two-point mounting of bracket assembly 72 provides increased stability in the mounting of cable splicing head 16 to the electrical pedestal, as compared to the stability provided by prior art bracket assembly 20.

Figure 7:
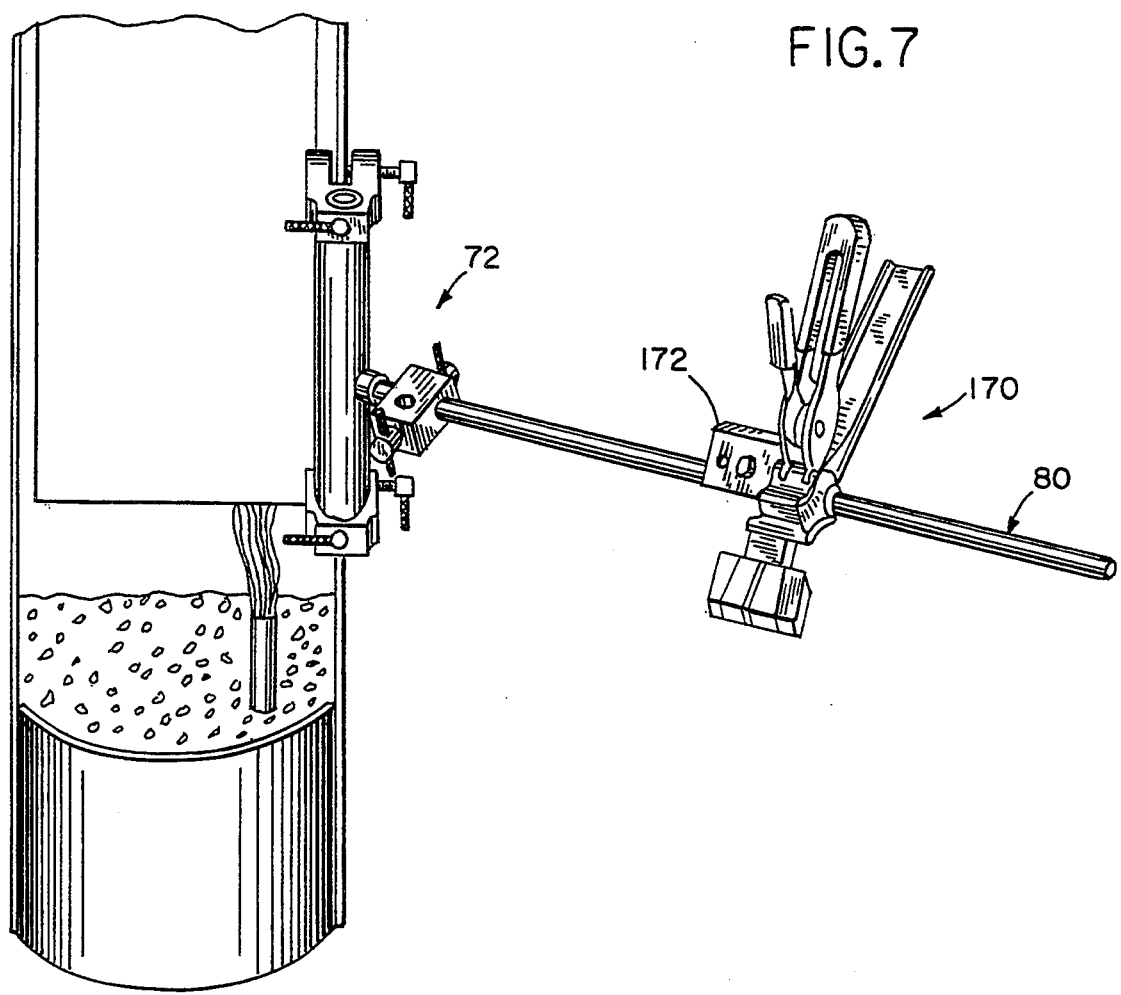
FIG. 7 is a view similar to FIG. 2, showing mounting of an alternate splicing tool to the bracket assembly of the invention.

FIG. 7 illustrates mounting of a splicing gun 170 to arm 80 of bracket assembly 72. Splicing gun 170 is only slightly modified by mounting a pair of spaced plates, one of which is shown at 172, with a threaded hand-operated screw extending between the pair of spaced plates for selectively clamping arm 80 between the plates, such as 172. With this arrangement, splicing gun 170, or any other tool, can be mounted to arm 80.

Various alternatives and embodiments are contemplated as being within the scope of the following claims particularly pointing out and distinctly claiming the subject matter regarded as the invention.

I claim:

1. A mounting bracket for mounting a cable splicing head to a pedestal having one or more walls, comprising:

a body member defining first and second ends;

a clamp member pivotably mounted to the body member adjacent each end of the body member for mounting the body member to one of the pedestal walls, wherein the clamp members include mounting means for mounting the clamp members and the body member at any desired location along the pedestal wall;

a position fixing arrangement interposed between each clamp member and the respective end of the body member for selectively fixing a rotational position of the respective body member end relative to the clamp member;

an arm mounted to and extending outwardly from the body member; and a mounting member releasably engaged with the arm and including a mounting arrangement for mounting the splicing head to the mounting member.

2. The mounting bracket of claim 1, wherein each clamp member defines an opening for and receives one of the ends of the body member, wherein the end of the body member is pivotable within the opening, and wherein the position fixing arrangement includes a set screw mounted to each clamp member movable into engagement with the end of the body member to fix the position of the body member relative to the clamp member.

3. The mounting bracket of claim 1, further comprising a removable mounting arrangement interposed between the arm and the body member.

4. The mounting bracket of claim 3, wherein the removable mounting arrangement comprises a threaded opening formed in the body member and a threaded end provided on the arm removably engaged within the threaded opening.

5. A mounting bracket for mounting a cable splicing head to a pedestal having one or more walls, the cable splicing head including a mounting shaft, comprising:
- a body member defining first and second ends;
- a clamp member pivotably mounted to each end of the body member for mounting the body member to one of the pedestal walls;
- a position fixing arrangement interposed between each clamp member and the respective end of the body member for selectively fixing the rotational position of the respective body member end relative to the clamp member;
- an arm mounted to and extending outwardly from the body member; and
- a mounting member releasably engaged with the arm and including a mounting arrangement for mounting the splicing head to the mounting member, wherein the mounting arrangement includes a passage in the mounting member within which the mounting shaft of the cable splicing head is received, and a set screw removably received within the passage for fixing the position of the cable splicing head mounting shaft relative to the mounting member.

6. The mounting bracket of claim 5, wherein the mounting arrangement of the mounting member further includes a second passage within which the arm is received, and a second set screw removably received within the second passage for fixing the position of the mounting member relative to the arm.

7. A mounting bracket for mounting a cable splicing head to a pedestal having one or more walls, comprising:
- a pair of spaced clamp members for mounting the bracket to one of the pedestal walls;
- a body member defining first and second ends, wherein the first end of the body member is pivotably mounted to a first one of the pair of clamp members and the second end of the body member is pivotably mounted to a second one of the pair of clamp members, wherein the clamp members include mounting means for mounting the clamp members and the body member to any desired location along the pedestal wall;
- an arm mounted to and extending outwardly from the body member; and
- a mounting member releasably engaged with the arm and including a mounting arrangement for mounting the cable splicing head to the mounting member.

8. A kit for mounting a cable splicing head to a pedestal having one or more walls, the cable splicing head having a mounting shaft, the kit comprising:
- a bracket assembly mountable to one of the pedestal walls, the bracket assembly including an arm extending outwardly from the pedestal when the bracket assembly is mounted thereto, wherein the bracket assembly comprises a body member defining first and second ends, a clamp member mounted to each end of the body member for mounting the body member to one of the pedestal walls, and wherein the arm is mounted to and extends outwardly from the body member; and
- a plurality of mounting members engageable with the arm, each mounting member defining a passage for receiving the mounting shaft of the cable splicing head, wherein the passage defined by each mounting member is oriented differently than a corresponding passage defined by the remainder of the mounting members, when each respective mounting member is engaged with the arm, to provide mounting of the cable splicing head in different orientations relative to the arm.

9. The kit of claim 8, further comprising a removable connection arrangement interposed between the arm and the body member.

10. The kit of claim 8, wherein each mounting member includes a second passage within which the arm is received for providing engagement of the mounting member with the arm.

11. The kit of claim 10, further comprising a first set screw removably received within the first-mentioned passage in each mounting member for fixing the position of the cable splicing head relative to the mounting member, and a second set screw removably received within the second passage in each mounting member for fixing the position of the mounting member relative to the arm.

* * * * *